(12) United States Patent
Nagaoka et al.

(10) Patent No.: US 9,919,970 B2
(45) Date of Patent: *Mar. 20, 2018

(54) DIELECTRIC MATERIAL FOR MULTILAYER CERAMIC CAPACITOR, AND MULTILAYER CERAMIC CAPACITOR

(71) Applicant: TAIYO YUDEN CO., LTD., Taito-ku, Tokyo (JP)

(72) Inventors: Kunihiko Nagaoka, Takasaki (JP); Kazumichi Hiroi, Takasaki (JP); Minoru Ryu, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,175

(22) Filed: Nov. 29, 2016

(65) Prior Publication Data

US 2017/0152187 A1    Jun. 1, 2017

(30) Foreign Application Priority Data

Dec. 1, 2015 (JP) .................................. 2015-234909
Nov. 29, 2016 (JP) .................................. 2016-231043

(51) Int. Cl.
*C04B 35/468* (2006.01)
*H01G 4/12* (2006.01)
(Continued)

(52) U.S. Cl.
CPC ......... *C04B 35/4682* (2013.01); *H01G 4/005* (2013.01); *H01G 4/1227* (2013.01);
(Continued)

(58) Field of Classification Search
CPC ......................... C04B 35/4682; H01G 4/1227
See application file for complete search history.

(56) References Cited

U.S. PATENT DOCUMENTS 5,990,029 A * 11/1999 Satoh ................... H01G 4/1227
                                                                        501/138
9,666,371 B2 * 5/2017 Morita ................. H01G 4/1227
(Continued)

FOREIGN PATENT DOCUMENTS

JP   H10330160 A   12/1998
JP   2001230150 A   8/2001
(Continued)

*Primary Examiner* — Karl Group
(74) *Attorney, Agent, or Firm* — Law Office of Katsuhiro Arai

(57) ABSTRACT

Dielectric layers are prepared using a dielectric material that contains a ceramic powder having Ba, Ti, and additive element X which is solid-solubilized and is at least one element selected from the group consisting of Mo, Ta, Nb, and W, wherein the standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of one grain of the ceramic powder into four equal parts, and two excluding the center point of the three points that divide the diameter crossing at right angles with the maximum diameter at its center point, into four equal parts.

4 Claims, 1 Drawing Sheet

(51) Int. Cl.
*H01G 4/30* (2006.01)
*H01G 4/005* (2006.01)

(52) U.S. Cl.
CPC ....... *H01G 4/30* (2013.01); *C04B 2235/3215* (2013.01); *C04B 2235/3236* (2013.01); *C04B 2235/3251* (2013.01); *C04B 2235/3256* (2013.01); *C04B 2235/3258* (2013.01); *C04B 2235/785* (2013.01)

(56) References Cited

U.S. PATENT DOCUMENTS

| | | | |
|---|---|---|---|
| 2007/0049485 A1* | 3/2007 | Tanabe | C01G 23/006 |
| | | | 501/136 |
| 2008/0214382 A1* | 9/2008 | Masumura | C04B 35/4682 |
| | | | 501/138 |
| 2016/0189865 A1* | 6/2016 | Kawamura | H01G 4/30 |
| | | | 361/301.4 |
| 2016/0217924 A1* | 7/2016 | Morita | C04B 35/4682 |

FOREIGN PATENT DOCUMENTS

| | | |
|---|---|---|
| JP | 2011256091 A | 12/2011 |
| WO | 2005093763 A1 | 10/2005 |

\* cited by examiner

DIELECTRIC MATERIAL FOR MULTILAYER CERAMIC CAPACITOR, AND MULTILAYER CERAMIC CAPACITOR

BACKGROUND

Field of the Invention

The present invention relates to a dielectric material for a multilayer ceramic capacitor (MLCC), as well as a multilayer ceramic capacitor using said dielectric material.

Description of the Related Art

Dielectric materials have been developed with the aim of making multilayer ceramic capacitors (MLCC) smaller in size, while increasing their capacitance. Dielectric materials for small, large-capacity multilayer ceramic capacitors are constituted by barium titanate, or $BaTiO_3$, and small amounts of additives. Recent years have seen a trend for accelerated sintering at lower temperature, which makes it difficult for the additives to diffuse and make them solid-solubilized fully during sintering, and this in turn makes it difficult to achieve the intended fine structure. A highly dispersed state of additives is desired as a solution, and materials constituted by $BaTiO_3$ in which additives are pre-solid-solubilized are being developed as a means to achieve this highly dispersed state of additives.

Patent Literature 1 discloses wet-reacting a titanium compound, barium compound, and compounds containing secondary constituent elements, and then calcinating the obtained product to prepare a perovskite composite oxide constituted by barium titanate grains in which the secondary constituent elements are solid-solubilized, and using this perovskite composite oxide, along with polymeric materials, to produce a composite dielectric material.

The distributions of abundance ratios of the aforementioned donor elements and other additive elements in the ceramic grains constituting the dielectric layers also affect the performance of the multilayer ceramic capacitor. Regarding this point, Patent Literature 2, for example, describes a dielectric ceramic with improved dielectric breakdown voltage, whose additive elements such as Mn, V, Cr, Co, Ni, Fe, Nb, Mo, Ta, and W are distributed roughly uniformly over the entire area from the crystal grain boundary to the center. In an example cited in this literature, barium carbonate, titanium oxide, and oxides of the aforementioned additive elements were mixed and calcinated at 1200° C., after which other compounds of additive elements were added and the mixture was calcinated further at 1000° C. in an oxidizing ambience, after which the obtained ceramic material mixture was used to prepare green sheets that were stacked and sintered for 2 hours at 1200° C. in a reducing ambience, and then heat-treated for 30 minutes at 600° C. in an oxidizing ambience, to obtain a laminated capacitor. The literature describes that, although the distributions of the additive elements in the dielectric ceramic constituting the laminated capacitor thus obtained were regulated to be roughly uniform, as mentioned above, actually, there were about a seven-fold difference between the grain boundary area and the center area.

Patent Literature 3 proposes a multilayer ceramic capacitor whose service life does not decrease due to dielectric breakdown, etc., even when its dielectric layers are increased and/or made thinner, thus allowing for size reduction and capacitance increase, wherein said multilayer ceramic capacitor is made of ceramic grains that are each constituted by a crystalline core and a shell that surrounds the core, where additive elements such as Mn, V, Cr, Mo, Fe, Ni, Cu, and Co are added to the core and the concentrations of these additive elements increase from the center of the core toward the shell. In an example cited in this literature, barium carbonate, titanium oxide, and chemical compounds of the aforementioned additive elements were mixed and calcinated for 2 hours at 200° C. to synthesize a barium titanate containing the additive elements, after which other of additive elements were added and the mixture was calcinated for 2 hours at 1000° C. to obtain ceramic grains, and these ceramic grains were used to prepare ceramic green sheets that were stacked and sintered for 3 hours at 1130° C. in a reducing ambience, and then heat-treated for 30 minutes at 600° C. in an oxidizing ambience, to obtain a multilayer ceramic capacitor. It is indicated that the concentrations of the additive elements in the cores, and concentrations of the additive elements in the shells, of the ceramic grains constituting the dielectric layers of the obtained multilayer ceramic capacitor, were approx. 290 ppm and approx. 410 ppm, respectively.

Also, Patent Literature 4 describes barium titanate ceramic grains, as a dielectric ceramic that gives a multilayer ceramic capacitor offering good capacitance vs. temperature characteristics as well as excellent service life characteristics, wherein said barium titanate ceramic grains are characterized in that they each have a core and a shell, and contain rare earth metals R and M (M is at least one type of element selected from a group that includes Mg, Mn, Ni, Co, Fe, Cr, Cu, Al, Mo, W, and V) as secondary constituents, where the total concentration of R and M slopes from the grain boundary toward the core and there are areas where the total concentrations becomes the minimum and maximum.

BACKGROUND ART LITERATURES

[Patent Literature 1] WO2005/093763 (U.S. Pat. No. 4,747,091)

[Patent Literature 2] Japanese Patent Laid-open No. Hei 10-330160

[Patent Literature 3] Japanese Patent Laid-open No. 2001-230150

[Patent Literature 4] Japanese Patent Laid-open No. 2011-256091

SUMMARY

However, these prior arts do not indicate solutions to the problems presented by multilayer ceramic capacitors whose dielectric layers have a thickness of 0.8 μm or less. To be specific, multilayer ceramic capacitors whose dielectric layers have a thickness of 0.8 μm or less present, under the conventional methods, problems in that non-uniformly solid-solubilized barium titanate is synthesized and the intended fine structure cannot be obtained, and the characteristics (capacitance vs. reliability vs. withstand voltage) do not improve, either.

The present invention was developed to solve these problems, and its object is to provide a multilayer ceramic capacitor offering good service life characteristics and withstand voltage characteristics even when its dielectric layers have a thickness of 0.8 μm or less.

Any discussion of problems and solutions involved in the related art has been included in this disclosure solely for the purposes of providing a context for the present invention, and should not be taken as an admission that any or all of the discussion were known at the time the invention was made.

The present invention that solves the aforementioned problems encompasses the following.

[1] A dielectric material that contains a ceramic powder having Ba, Ti, and additive element X which is at least one type of element selected from a group that includes Mo, Ta, Nb, and W, wherein the standard deviation of the ratio of the peak intensity of the additive element X (XKα) measured by STEM-EDX (scanning electron microscopy/energy-dispersive X-ray analysis), and the sum of the peak intensity of the Ti and peak intensity of the Ba (BaLα+TiKα) measured by STEM-EDX, is less than 10.5% of the average ratio as measured at a total of five points per grain including the three points that divide the maximum diameter of one grain of the ceramic powder into four equal parts, and two excluding the center point of the three points that divide the diameter crossing at right angles with the maximum diameter, at its center point, into four equal parts.

[2] A dielectric material according to [1], wherein 80 percent by quantity or more of the ceramic powder is accounted for by gains whose standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of the grain into four equal parts, and two excluding the center point of the three points that divide the diameter crossing at right angles with the maximum diameter, at its center point, into four equal parts.

[3] A dielectric material according to [1] or [2], wherein the abundance of additive element X in the ceramic powder is 0.05 to 0.3 mol per 100 mol of Ti.

[4] A dielectric material according to any one of [1] to [3], wherein the average grain size of the ceramic powder is 200 nm or less.

[5] A multilayer ceramic capacitor having a laminate constituted by pairs of internal electrode layers of different polarities that are stacked alternately together with a dielectric layer between each pair, wherein said multilayer ceramic capacitor is characterized in that the dielectric layers are sintered bodies made of a dielectric material that contains a ceramic powder having Ba, Ti, and additive element X which is at least one type of element selected from a group that includes Mo, Ta, Nb, and W, wherein the standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of one grain of the ceramic powder into four equal parts, and two excluding the center point of the three points that divide the diameter crossing at right angles with the maximum diameter, at its center point, into four equal parts.

[6] A multilayer ceramic capacitor according to [5], characterized in that the dielectric layers are sintered bodies made of a dielectric material, wherein 80 percent by quantity or more of its ceramic powder is accounted for by gains whose standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of the grain into four equal parts, and two of the three points that divide the diameter crossing at right angles with the maximum diameter, at its center point, into four equal parts, excluding the center point.

[7] A multilayer ceramic capacitor according to [5] or [6], wherein the abundance of additive element X in the dielectric layers is 0.05 to 0.3 mol per 100 mol of Ti.

According to the present invention, each desired additive element (such as molybdenum) is solid-solubilized in all barium titanate grains and the difference in the distribution of the additive element within the grain becomes small, and this reduces the electrical characteristics variations in the grains constituting the multilayer ceramic capacitor and therefore improves its reliability. Also, the multilayer ceramic capacitor maintains a high specific dielectric constant even when it is constituted by fine grains whose average grain size is 100 nm or less. As a result, multilayer ceramic capacitors offering high electrostatic capacitance as well as good service life characteristics and withstand voltage characteristics, even when its dielectric layers have a thickness of 0.8 μm or less, can be supplied in a stable manner.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
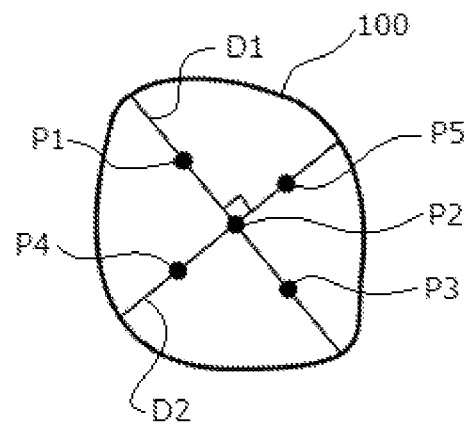
FIG. 1 is a drawing showing measurement points in a barium titanate grain in which of additive element X is solid-solubilized.

1 Multilayer ceramic capacitor
10 Sintered ceramic compact
11 Laminate
12 Dielectric layer
13 Internal electrode layer
15 Cover layer
20 External electrode

DETAILED DESCRIPTION OF EMBODIMENTS

The dielectric material proposed by the present invention contains a ceramic powder having Ba, Ti, and additive element X. Here, X is at least one type of element selected from a group that includes Mo, Ta, Nb, and W, and preferably Mo. At the specified points per grain of the ceramic powder, the standard deviation of the ratio of the peak intensity of the additive element X (XKα) measured by STEM-EDX, and the sum of the peak intensity of the Ti and peak intensity of the Ba (BaLα+TiKα) measured by STEM- EDX, is less than 10.5% of the average ratio. The specified points are five points selected as follows (see FIG. 1). To be specific, they are a total of five points including the three points (P1, P2, and P3) that divide the maximum diameter (D1) of one grain (100) of the ceramic powder into four equal parts (one of them, P2, is the center point of the maximum diameter, D1), and two (P4 and P5) excluding the center point (P2) of the three points (P2, P4, and P5) that divide the diameter (D2) crossing at right angles with the maximum diameter (D1), at its center point (P2), into four equal parts. The black dots in FIG. 1 represent the five points.

By using the dielectric material proposed by the present invention, a multilayer ceramic capacitor of high dielectric constant (2200 to 5000), and offering good service life characteristics even when its dielectric layers have a thickness of 0.8 µm or less, can be obtained.

Also, the dielectric material proposed by the present invention is such that, preferably with the dielectric material, 80 percent by quantity or more of the ceramic powder is accounted for by gains whose standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of the grain into four equal parts (one of them is the center point of the maximum diameter), and two excluding the center point of the three points that divide the diameter crossing at right angles with the maximum diameter, at its center point, into four equal parts. 90 percent by quantity or more is favorable.

Furthermore, the dielectric material proposed by the present invention is such that, preferably with the dielectric material, the abundance of additive element X in the ceramic powder is 0.05 to 0.3 mol per 100 mol of Ti. This way, the withstand voltage characteristics can be made even better.

Furthermore, the dielectric material proposed by the present invention is such that, preferably with the dielectric material, the average grain size of the ceramic powder is 200 nm or less. This way, even when the dielectric layers have a thickness of 0.8 µm or less, a sufficient number of grain boundaries (parts of a layer not constituted by one grain) can be obtained more easily, and this in turn makes the service life characteristics and withstand voltage characteristics even better.

The multilayer ceramic capacitor proposed by the present invention is a multilayer ceramic capacitor having a laminate constituted by pairs of internal electrode layers of different polarities that are stacked alternately together with a dielectric layer between each pair, wherein the dielectric layers are sintered bodies made of the ceramic powder. This way, a multilayer ceramic capacitor offering high electrostatic capacitance and good service life characteristics can be obtained.

[Manufacturing of Barium Titanate in which Additive Element X is Dissolved]

The following explains a state of, and method for preparing, barium titanate in which additive element X is solid-solubilized, where additive element X is uniformly solid-solubilized in barium titanate grains and the inside-grain and inter-grain variation in the solid-solubilized amount of additive element X is very small, for the purpose of creating intended multilayer ceramic capacitor characteristics/fine structure.

Various methods for synthesizing barium titanate are known, such as the solid-phase method, sol-gel method, hydrothermal method, etc. Under the present invention, any of these methods can be adopted.

Here, the present invention is explained by using the solid-phase method, which gives dielectric materials of high crystallinity and specific dielectric constant, as an example. It should be noted that, although additive element X is molybdenum in the example explained below, additive element X is not limited to Mo and the same example applies when it is Ta, Nb, or W.

A $TiO_2$ powder and a $BaCO_3$ powder are mixed with pure water or other solvent, and dispersant, etc., to prepare a slurry and a pre-ionized or complexed molybdenum compound is added to this slurry, or a powder of molybdenum compound is added to and mixed with a mixed slurry of $TiO_2$ and $BaCO_3$ and then the mixture is treated to ionize or complex the molybdenum, and the obtained slurry is kneaded and dispersed. The slurry is kneaded and dispersed for 20 to 30 hours using a beads mill, etc. Next, this slurry is dried to obtain a raw material. This raw material is calcinated at 800 to 1150° C., to obtain barium titanate in which molybdenum is solid-solubilized.

It should be noted that the specific surface area of titanium material is preferably in a range of 10 to 300 $m^2/g$ from the viewpoint of synthesizing fine barium titanate while suppressing the variation in the distribution of abundance of additive element X in the ceramic grains constituting the dielectric layers, while the specific surface area of barium material is preferably in a range of 10 to 50 $m^2/g$ from the viewpoint of synthesizing fine barium titanate while suppressing the variation in the distribution of abundance of additive element X in the ceramic grains constituting the dielectric layers. The specific surface area of the compound containing additive element X is preferably in a range of 2 to 20 $m^2/g$ from the viewpoint of suppressing the variation in the distribution of abundance of additive element X in the ceramic grains constituting the dielectric layers.

The source of Mo is not limited in type, shape, grade, etc., so long as it can be dissolved in the slurry and has no negative effect on the dielectric. To be specific, it can be molybdenum oxide (IV), molybdenum oxide (VI), molybdenum chloride (II), molybdenum chloride (III), molybdenum chloride (IV), molybdenum hydroxide (III), molybdenum hydroxide (V), barium molybdate, or ammonium molybdate.

If molybdenum oxide (VI) is used, for example, the method for dissolving Mo may be the method to dissolve and ionize Mo beforehand using an aqueous ammonium solution or other pH-adjusting agent, the method to dissolve and ionize/complex Mo using any of the various dispersants used in a mixed slurry of $TiO_2$ and $BaCO_3$ (such as ammonium citrate or SN Dispersant 5468 (product name), a dispersant manufactured by Sannopco), or the method to let Mo stand for many hours in pure water or other solvent to ionize it as molybdenum hydroxide.

Molybdenum can be added at the same time as barium and titanium, or after barium and titanium are mixed; to achieve good dispersibility, however, the mixture of barium, titanium, and molybdenum must be kneaded and dispersed for 20 to 30 hours. The mixed powder is dried and calcinated to obtain barium titanate powder containing a solid solution of molybdenum.

The average grain size of the barium titanate powder containing a solid solution of additive element X obtained by the method explained above, which is used in the manufacture of the multilayer ceramic capacitor proposed by the present invention, is 200 nm or less, or preferably 50 to 250 nm, or more preferably 50 to 150 nm. The measurement method of average grain size is described below.

Specified additive compounds may be added to the obtained barium titanate powder according to the purpose. The aforementioned additive compounds include MgO, $MnCO_3$, oxides of rare earth elements (Y, Dy, Tm, Ho, Er), and oxides of Y, Sm, Eu, Gd, Tb, Er, Tm, Cr, V, Mn, Co, Ni, Li, B, Na, K, and Si.

A ceramic powder that contains a barium titanate powder obtained as above, for example, can be crushed to adjust the grain or classified further to regulate the grain size, if necessary.

[Manufacturing Method of Multilayer Ceramic Capacitor]

Figure 2:
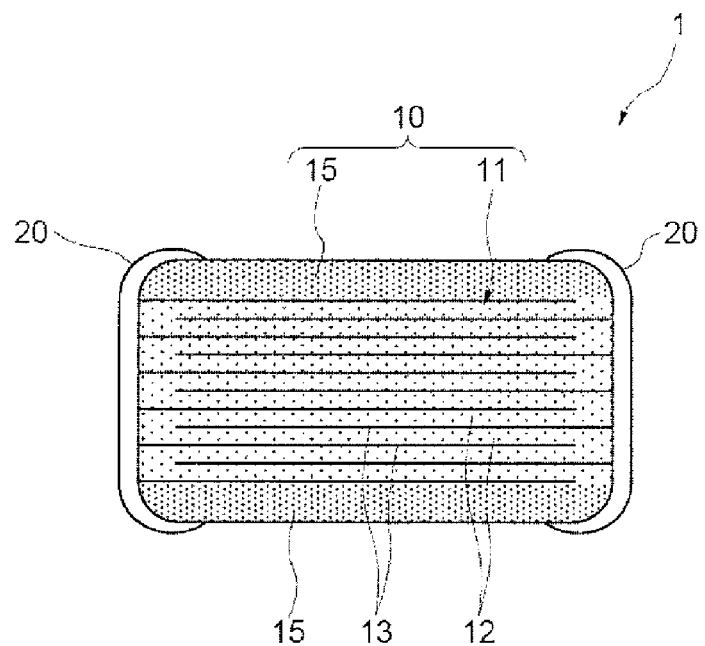
FIG. 2 is a rough longitudinal section view of a multilayer ceramic capacitor in an embodiment of the present invention

The following explains the method for manufacturing a multilayer ceramic capacitor using the barium titanate powder in which additive element X is solid-solubilized, as explained above, pertaining to the present invention (FIG. 2).

Polyvinyl butylal (PVB) resin or other binder, ethanol, toluene, or other organic solvent, and dioctyl phthalate (DOP) or other plasticizer, are added to the aforementioned ceramic powder and the ingredients are wet-mixed. The obtained slurry is coated, using the die coating method and doctor blade method, for example, on a base material in a belt shape of 1.0 μm or less in thickness, as a dielectric green sheet, and the slurry is dried. Then, a metal conductive paste containing organic binder is printed on the surface of the dielectric green sheet by means of screen printing or gravure printing, to put in place internal electrode layer patterns that are alternately led out a pair of external electrodes of different polarities. For the aforementioned metal, nickel is widely adopted from the viewpoint of cost. It should be noted that barium titanate of 50 nm or less in average grain size can be uniformly dispersed in the metal conductive paste as a co-material.

Thereafter, the dielectric green sheet on which the internal electrode layer patterns have been printed is stamped out to specified sizes and a specified number (such as 100 to 500) of sheets stamped out from the dielectric green sheet only are stacked in such a way that, with the base material separated, the internal electrode layers 13 and dielectric layers 12 alternate and the ends of the internal electrode layers are alternately exposed to the two end faces of the dielectric layers in the length direction and led out alternately to the pair of external electrodes of different polarities. Cover sheets that will become the cover layers 15 are pressure-welded to the top and bottom of the stacked dielectric green sheets, which is then cut to specified chip dimensions (such as 0.6 mm×0.3 mm), after which a Ni conductive paste that will become the external electrodes 20 is coated on both end faces of the cut laminate and dried. This way, a compact of multilayer ceramic capacitor 1 is obtained. External electrodes can also be deposited as thick film on both end faces of the laminate according to the sputtering method.

The compact of multilayer ceramic capacitor thus obtained is put through a $N_2$ ambience of 250 to 500° C. to remove the binder, and then sintered for 10 minutes to 2 hours at 1100 to 1300° C. in a reducing ambience to sinter the chemical compounds constituting the dielectric green sheet and grow the grains. This way, a multilayer ceramic capacitor 1 that has a laminate 11 which internally has alternately stacked dielectric layers 12 constituted by a sintered body and internal electrode layers 13, and also has cover layers 15 formed as outermost layers at the top and bottom in the laminating direction, is obtained.

Also, under the present invention, reoxidization may be performed at 600 to 1000° C.

Additionally, as other embodiment relating to the method for manufacturing multilayer ceramic capacitor, external electrodes and dielectrics can be sintered in different processes. For example, a laminate of layered dielectrics can be sintered and then a conductive paste can be baked on both ends thereof to form external electrodes.

[Multilayer Ceramic Capacitor]

The multilayer ceramic capacitor 1 thus obtained is generally constituted by a sintered ceramic compact 10 having a standard-specified chip size and shape (such as rectangular solid of 0.6×0.3×0.3 mm in size), as well as a pair of external electrodes 20 formed on both sides of the sintered ceramic compact 10. The sintered ceramic compact 10 is primarily constituted by grain crystal containing Ba and Ti, and has a laminate 11 whose interior is constituted by alternately stacked dielectric layers 12 and internal electrode layers 13 as well as cover layers 15 formed at the top and bottom of it in the stacking direction as outermost layers.

The laminate 11 has a high-density, multi-layer structure of around several hundred to a thousand layers in total, where the thickness of the dielectric layer 12 sandwiched by two internal electrode layers 13 is 0.8 μm or less according to the capacitance, required pressure resistance, and other specifications.

The cover layers 15 formed as the outermost layers of the laminate 11 protect the dielectric layers 12 and internal electrode layers 13 from moisture, contaminants, and other polluting substances from the outside and prevent them from deterioration over time.

Also, the internal electrode layers 13 have their ends led out alternately to a pair of external electrodes 20 of different polarities present at both ends of the dielectric layers 12 in the length direction.

Also, the dielectric layers 12 of the multilayer ceramic capacitor 1 proposed by the present invention are manufactured from a dielectric material which is a ceramic powder having Ba, Ti, and additive element X (here, X is at least one type of element selected from a group that includes Mo, Ta, Nb, and W), and at the specified points in one grain of the ceramic powder, the standard deviation of the ratio of the peak intensity of the additive element X (XKα) measured by STEM-EDX, and the sum of the peak intensity of the Ti and peak intensity of the Ba (Baα+TiKα) measured by STEM-EDX, is less than 10.5% of the average ratio.

Because the distribution of abundance of additive element X is roughly uniform, as described above, the effects of additive element X are achieved over the entire ceramic grains constituting the dielectric layers 12 and little variation occurs in terms of oxygen deficiency level, resulting in efficient improvements of service life characteristics and withstand voltage characteristics. Furthermore, such uniform distribution allows the effects of additive element X to be achieved by adding it by a smaller amount, and also because a smaller amount of additive element X means there are no points where its abundance is particularly high, any drop in the specific dielectric constant due to a smaller average grain size can be suppressed compared to when the distribution of abundance varies.

It should be noted that, as shown in FIG. 1, the specified points measured by STEM-EDX are a total of five points including the three points that divide the maximum diameter of one grain into four equal parts (one of them is the center point of the maximum diameter), and two excluding the center point of the three points that divide the diameter crossing at right angles with the maximum diameter, at its center point, into four equal parts.

This is explained in greater detail below. Specifically, as to the five points, TEM-EDS measurement is used to obtain the peak intensity of additive element X (XKα), peak intensity of Ti (TiKα) and peak intensity of Ba (BaLα), and the ratio of these intensities (XKα/{BaLα+TiKα}) is calculated. This results in five calculated intensity ratios, and theses intensity ratios each represent the relative abundance of additive element X relative to Ba and Ti at each measurement location. Then, a standard deviation of the five intensity ratios is obtained and checked to see if it is less than 10.5% of the average ratio.

When this calculation of variation in peak intensity ratio is performed on one grain of the ceramic powder, at the aforementioned five specified points, the standard deviation of the ratio of the peak intensity of additive element X (XKα) measured by STEM-EDX, and the sum of the peak intensities of Ba and Ti (BaLα+TiKα) measured by STEM-EDX, is less than 10.5% of the average ratio under the present invention.

Measurement of peak intensity ratio, etc., is explained in detail in "Examples."

From the viewpoint of service life characteristics and bias characteristics of the multilayer ceramic capacitor 1, the aforementioned calculation of variation in peak intensity ratio performed on any n number of grains (normally 10 to 20 grains) randomly selected from inside the ceramic powder should find that the standard deviation of the ratio of the peak intensity of additive element X (XKα) measured by STEM-EDX at the specified five points, and the sum of the peak intensity of Ti and peak intensity of Ba (BaLα+TiKα) measured by STEM-EDX, is less than 10.5% of the average ratio in 80 percent or more, or preferably 90 percent or more, of the n number of grains under the present invention.

adjusted until around 80 grains are observed in one image, and a total of randomly selected 300 grains or more are observed. The Feret diameter is a directed tangential diameter defined by the distance between two parallel tangential lines sandwiching a grain.

EXAMPLES

The following explains the present invention in greater detail using Examples and Comparative Examples. It should be noted, however, that the present invention is not limited to the Examples in any way.

Example 1

A slurry was obtained by adding $TiO_2$ of 100 $m^2/g$ in specific surface area and $BaCO_3$ of 30 $m^2/g$ in specific surface area to a mixed solvent of ion-exchanged water and dispersant at a ratio of Ba:Ti=1:1. Hexaammonium heptamolybdate tetrahydrate was added to this slurry so that Mo will be contained by 0.2 mol relative to 100 mol of Ti, to obtain a slurry in which Mo was dissolved. This slurry was dispersed for 30 hours in a bead mill. The dispersed slurry was dried by droplet spraying to obtain a raw material. Then, this raw material was calcinated in air at 1020° C. to obtain barium titanate in which Mo was solid-solubilized, which had an average grain size of 150 nm.

For the obtained Mo-solid solubilized barium titanate, the ratio of the peak intensity of Mo (MoKα) and the sum of the peak intensity of Ti and peak intensity of Ba (BaLα+TiKα) (MoKα/{BaLα+TiKα}) was measured at the specified five points. The measurement was performed in the form of TEM-EDS (using the JEM-2100F, a TEM manufactured by JEOL and the JED-2300T, an EDS detector manufactured by JEOL). Table 1 shows the measured results of 10 grains.

TABLE 1

| Measured Results in Example 1 | | | | | | | | | | | |
|---|---|---|---|---|---|---|---|---|---|---|---|
| | MoKα/(BaLα + TiKα) intensity ratio ×10^−4 | | | | | | | | | | |
| | Measurement (grain) No. | | | | | | | | | | n = 50 |
| | 1 | 2 | 3 | 4 | 5 | 6 | 7 | 8 | 9 | 10 | as a whole |
| Center | 0.71 | 0.70 | 0.70 | 0.67 | 0.77 | 0.69 | 0.66 | 0.71 | 0.69 | 0.70 | |
| Peripheral 1 | 0.69 | 0.77 | 0.67 | 0.67 | 0.70 | 0.70 | 0.68 | 0.68 | 0.70 | 0.71 | |
| Peripheral 2 | 0.69 | 0.57 | 0.69 | 0.77 | 0.78 | 0.70 | 0.66 | 0.72 | 0.71 | 0.70 | |
| Peripheral 3 | 0.73 | 0.71 | 0.75 | 0.67 | 0.76 | 0.67 | 0.74 | 0.78 | 0.72 | 0.76 | |
| Peripheral 4 | 0.78 | 0.77 | 0.78 | 0.70 | 0.71 | 0.66 | 0.71 | 0.70 | 0.70 | 0.69 | |
| Average (ave) | 0.72 | 0.70 | 0.72 | 0.70 | 0.74 | 0.68 | 0.69 | 0.72 | 0.70 | 0.71 | 0.7090 |
| σ (n) | 0.0335 | 0.0731 | 0.0407 | 0.0388 | 0.0326 | 0.0162 | 0.0310 | 0.0337 | 0.0102 | 0.0248 | 0.0406 |
| σ(n)/ave [%] | 4.65 | 10.38 | 5.67 | 5.57 | 4.38 | 2.38 | 4.49 | 4.69 | 1.45 | 3.49 | 5.73 |

The multilayer ceramic capacitor 1 as proposed by the present invention has its dielectric layers 12 manufactured from the new dielectric material where the distribution of abundance of additive element X is uniform, as explained above.

The average grain size of the ceramic powder contained in the dielectric material proposed by the present invention is not limited in any way, but it is preferably 50 to 200 nm from the viewpoint of making the dielectric layers 12 thinner. It should be noted that, in this Specification, the average grain size represents the average of the measured Feret diameters of all grains observed in multiple images obtained by observing ceramic grains using a scanning electron microscope (SEM) or transmission electron microscope (TEM) in such a way that the magnification factor is In Table 1, "Average (ave)" refers to an average intensity ratio of MoKα/(BaLα+TiKα), "σ(n)" refers to a standard deviation of intensity ratios of MoKα/(BaLα+TiKα) wherein "n" refers to the number of data, and "σ(n)/ave [%]" refers to a ratio of the standard deviation to the average intensity ratio in percentage.

The results show that the obtained Mo-solid solubilized barium titanate grains had a standard deviation MoKα/(BaLα+TiKα) which was 5.73% of the average ratio in the grains as a whole, meeting the condition of less than 10.5%. Also, the standard deviation was less than 10.5% of the average ratio for 10 out of 10 grains.

Next, additive materials were added to 100 mol of this Mo-solid solubilized barium titanate at ratios of $Ho_2O_3$=0.5 mol, $MnCO_3$=0.1 mol, $V_2O_5$=0.1 mol and $SiO_2$=1.0 mol, and BaCO$_3$ or TiO$_2$ was added to adjust the Ba/Ti mol ratio (mol ratio of Ba and Ti in the total amount of Mo-solid solubilized barium titanate and BaCO$_3$ or TiO$_2$ being added) to 1.000, after which solvent was added to make a slurry. PVB binder was added to this slurry and the resulting slurry was coated on a PET film to a thickness of 0.9 μm, as a green sheet.

Next, a Ni conductive paste was printed on the green sheet as internal electrodes, and the printed green sheet was used to prepare a 288-layer multilayer ceramic capacitor of 0603 shape. After the binder was removed, the multilayer ceramic capacitor was sintered for 0.5 hour in a reducing ambience at 1200° C. and re-oxidized in a N$_2$ ambience at 800° C. After the sintering, the dielectric layers were 0.65 μm thick and the internal electrode layers were 0.6 μm thick.

The obtained multilayer ceramic capacitor was measured for dielectric constant, withstand voltage characteristics, and service life characteristics (HALT: Highly Accelerated Life Test).

In the measurement of dielectric constant, first the electrostatic capacitance of the multilayer ceramic capacitor was measured, and this electrostatic capacitance, as well as the cross area of internal electrodes, dielectric layer thickness, and number of internal electrode layers, were used to calculate the dielectric constant. Ten samples were measured and their average was taken. As a result, the dielectric constant was 3300.

In the measurement of withstand voltage characteristics, voltage was applied at a step-up rate of 20 V/sec and the voltage at which shorting occurred was used. Ten samples were measured and their average was taken. As a result, this voltage was 100 V.

In the measurement of service life characteristics, a DC electric field of 10 V/μm was applied to 10 multilayer ceramic capacitors at a temperature of 125° C. The time needed for the insulation resistance (ρ) any one of the 10 multilayer ceramic capacitors to become 1×1010 Ωcm was used. As a result, the service life characteristics were 770 min.

Example 2

A multilayer ceramic capacitor was prepared by obtaining barium titanate grains in the same manner as in Example 1, except that molybdenum oxide (specific surface area 5 m$^2$/g) was used as Mo material.

When the peak intensity ratio was measured at five locations each on 10 of the barium titanate grains obtained, the standard deviation was 3.50% of the average ratio as a whole, and all grains had a standard deviation of less than 10.5% of the average ratio. Also, the prepared multilayer ceramic capacitor had a dielectric constant of 3990, withstand voltage characteristics of 110 V, and service life characteristics of 934 min.

Example 3

A multilayer ceramic capacitor was prepared by obtaining barium titanate grains in the same manner as in Example 1, except that the slurry to which TiO$_2$ and BaCO$_3$ were added was dispersed for 25 hours, after which hexaammonium heptamolybdate tetrahydrate was added and the mixture was dispersed for 5 more hours.

When the peak intensity ratio was measured at five locations each on 10 of the barium titanate grains obtained, the standard deviation was 6.00% of the average ratio as a whole, and all grains had a standard deviation of less than 10.5% of the average ratio. Also, the prepared multilayer ceramic capacitor had a dielectric constant of 3650, withstand voltage characteristics of 70 V, and service life characteristics of 532 min.

Example 4

A multilayer ceramic capacitor was prepared by obtaining barium titanate grains in the same manner as in Example 1, except that the dispersion time was changed to 25 hours.

When the peak intensity ratio was measured at five locations each on 10 of the barium titanate grains obtained, the standard deviation was 4.70% of the average ratio as a whole, and all grains had a standard deviation of less than 10.5% of the average ratio. Also, the prepared multilayer ceramic capacitor had a dielectric constant of 3050, withstand voltage characteristics of 88 V, and service life characteristics of 610 min.

Example 5

A multilayer ceramic capacitor was prepared by obtaining barium titanate grains in the same manner as in Example 1, except that TiO$_2$ of 30 m$^2$/g in specific surface area was used as Ti material and the calcination temperature was changed to 1040° C.

When the peak intensity ratio was measured at five locations each on 10 of the barium titanate grains obtained, the standard deviation was 8.80% of the average ratio as a whole, and eight of the 10 grains had a standard deviation of less than 10.5% of the average ratio. Also, the prepared multilayer ceramic capacitor had a dielectric constant of 3350, withstand voltage characteristics of 76 V, and service life characteristics of 680 min.

Example 6

A multilayer ceramic capacitor was prepared by obtaining barium titanate grains in the same manner as in Example 5, except that TiO$_2$ of 300 m$^2$/g in specific surface area was used as Ti material.

When the peak intensity ratio was measured at five locations each on 10 of the barium titanate grains obtained, the standard deviation was 1.10% of the average ratio as a whole, and all grains had a standard deviation of less than 10.5% of the average ratio. Also, the prepared multilayer ceramic capacitor had a dielectric constant of 3980, withstand voltage characteristics of 120 V, and service life characteristics of 1050 min.

Example 7

A multilayer ceramic capacitor was prepared by obtaining barium titanate grains in the same manner as in Example 1, except that hexaammonium heptamolybdate tetrahydrate was added so that Mo would be contained by 0.3 mol relative to 100 mol of Ti and the calcination temperature was changed to 980° C.

When the peak intensity ratio was measured at five locations each on 10 of the barium titanate grains obtained, the standard deviation was 4.00% of the average ratio as a whole, and all grains had a standard deviation of less than 10.5% of the average ratio. Also, the prepared multilayer ceramic capacitor had a dielectric constant of 3100, withstand voltage characteristics of 140 V, and service life characteristics of 1080 min.

Example 8

A multilayer ceramic capacitor was prepared by obtaining barium titanate grains in the same manner as in Example 1, except that hexaammonium heptamolybdate tetrahydrate was added so that Mo would be contained by 0.05 mol relative to 100 mol of Ti and the calcination temperature was changed to 1040° C.

When the peak intensity ratio was measured at five locations each on 10 of the barium titanate grains obtained, the standard deviation was 2.00% of the average ratio as a whole, and all grains had a standard deviation of less than 10.5% of the average ratio. Also, the prepared multilayer ceramic capacitor had a dielectric constant of 3700, withstand voltage characteristics of 50 V, and service life characteristics of 190 min.

Example 9

Mo-solid solubilized barium titanate grains of 50 nm in average grain size were obtained in the same manner as in Example 1, except that $TiO_2$ of 300 $m^2/g$ in specific surface area was used as Ti material and the calcination temperature was changed to 810° C. This barium titanate was used to prepare a multilayer ceramic capacitor in the same manner as in Example 1.

When the peak intensity ratio was measured at five locations each on 10 of the barium titanate grains obtained, the standard deviation was 4.00% of the average ratio as a wholde, and all grains had a standard deviation of less than 10.5% of the average ratio. Also, the prepared multilayer ceramic capacitor had a dielectric constant of 2700, withstand voltage characteristics of 210 V, and service life characteristics of 1800 min.

Example 10

Mo-solid solubilized barium titanate grains of 100 nm in average grain size were obtained in the same manner as in Example 1, except that the calcination temperature was changed to 960° C. This barium titanate was used to prepare a multilayer ceramic capacitor in the same manner as in Example 1.

When the peak intensity ratio was measured at five locations each on 10 of the barium titanate grains obtained, the standard deviation was 3.30% of the average ratio as a whole, and all grains had a standard deviation of less than 10.5% of the average ratio. Also, the prepared multilayer ceramic capacitor had a dielectric constant of 3350, withstand voltage characteristics of 170 V, and service life characteristics of 1300 min.

Example 11

Mo-solid solubilized barium titanate grains of 200 nm in average grain size were obtained in the same manner as in Example 1, except that the calcination temperature was changed to 1085° C. This barium titanate was used to prepare a multilayer ceramic capacitor in the same manner as in Example 1.

When the peak intensity ratio was measured at five locations each on 10 of the barium titanate grains obtained, the standard deviation was 2.10% of the average ratio as a whole, and all grains had a standard deviation of less than 10.5% of the average ratio. Also, the prepared multilayer ceramic capacitor had a dielectric constant of 4200, withstand voltage characteristics of 60 V, and service life characteristics of 250 min.

Examples 12, 13, 14, 15

A multilayer ceramic capacitor was prepared by obtaining barium titanate grains in the same manner as in Example 1, except that Ta, Nb, W, and Mo+Ta (each material had a specific surface area of 5 $m^2/g$ or more) was used, respectively, as additive element X instead of Mo.

When the peak intensity ratio was measured at five locations each on 10 of the barium titanate grains obtained, the standard deviation was less than 10.5% of the average ratio on all grains. Also, all of the prepared multilayer ceramic capacitors had a dielectric constant of 3500 or higher, withstand voltage characteristics of 70 V or above, and service life characteristics of 600 min or longer.

Comparative Example 1

A slurry was obtained by adding $TiO_2$ of 100 $m^2/g$ in specific surface area and $BaCO_3$ of 30 $m^2/g$ in specific surface area to a mixed solvent of ion-exchanged water and dispersant at a ratio of Ba:Ti=1:1. This slurry was dispersed for 30 hours in a bead mill. Hexaammonium heptamolybdate tetrahydrate was added to this slurry so that Mo would be contained by 0.2 mol relative to 100 mol of Ti, and the mixture was agitated for 1 hour. The resulting slurry was dried by droplet spraying to obtain a raw material. Then, this raw material was calcinated in air at 1020° C. to obtain barium titanate in which Mo was solid-solubilized, which had an average grain size of 150 nm. This barium titanate was used to prepare a multilayer ceramic capacitor in the same manner as in Example 1.

When the peak intensity ratio was measured at five locations each on 10 of the barium titanate grains obtained, the standard deviation was 20.80% of the average ratio as a whole, and all grains had a standard deviation exceeding 10.5% of the average ratio. Also, the prepared multilayer ceramic capacitor had a dielectric constant of 3500, withstand voltage characteristics of 35 V, and service life characteristics of 98 min.

Comparative Example 2

A multilayer ceramic capacitor was prepared by obtaining barium titanate in the same manner as in Example 1, except that Mo was not added. The prepared multilayer ceramic capacitor had a dielectric constant of 3500, withstand voltage characteristics of 11 V, and service life characteristics of 18 min.

Comparative Example 3

A multilayer ceramic capacitor was prepared by obtaining barium titanate of 50 nm in average grain size in the same manner as in Example 9, except that Mo was not added. The prepared multilayer ceramic capacitor had a dielectric constant of 2700, withstand voltage characteristics of 95 V, and service life characteristics of 880 min.

The aforementioned results of Examples and Comparative Examples are summarized in Table 2. Samples with a dielectric constant of 2500 or higher, withstand voltage characteristics of 50 V or above, and service life characteristics of 150 min or longer, were deemed acceptable. Attention is drawn to Comparative Example 3 where the dielectric constant, withstand voltage characteristics and service life characteristics are all at acceptable levels. This is because the withstand voltage characteristics and service life characteristics are affected by the relationship between the thickness of dielectric and the average grain size. Comparative Example 3 should be compared against Example 9 where the average grain size is the same. When Example 9 and Comparative Example 3 are compared, the multilayer ceramic capacitor in Example 9 presents notably improved withstand voltage characteristics and service life characteristics. This shows that the smaller the average grains size becomes to a level of 100 nm or less, the higher the effects of the present invention become.

is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having a laminate constituted by pairs of internal electrode layers of different polarities that are stacked alternately together with a dielec-

TABLE 2

| | Barium titanate | | | | | MLCC | | | |
|---|---|---|---|---|---|---|---|---|---|
| | Barium titanate grain size (nm) | X constituent | Content of X constituent (mol) | Variation of X in grain (standard deviation with reference to the average wherein n = 50) (%) | Ratio of grains whose standard deviation is less than 10.5% of the average (%) | Judgment | Layer thickness (μm) | Average service life characteristics by HALT (min) | Withstand voltage characteristics (V) | Dielectric constant |
| Example 1 | 150 | Mo | 0.2 | 5.73 | 100 | ○ | 0.65 | 770 | 100 | 3300 |
| Example 2 | 150 | Mo | 0.2 | 3.50 | 100 | ○ | 0.65 | 934 | 110 | 3990 |
| Example 3 | 150 | Mo | 0.2 | 6.00 | 100 | ○ | 0.65 | 532 | 70 | 3650 |
| Example 4 | 150 | Mo | 0.2 | 4.70 | 100 | ○ | 0.65 | 610 | 88 | 3050 |
| Example 5 | 150 | Mo | 0.2 | 8.80 | 80 | ○ | 0.65 | 680 | 76 | 3350 |
| Example 6 | 150 | Mo | 0.2 | 1.10 | 100 | ○ | 0.65 | 1050 | 120 | 3980 |
| Example 7 | 150 | Mo | 0.3 | 4.00 | 100 | ○ | 0.65 | 1080 | 140 | 3100 |
| Example 8 | 150 | Mo | 0.05 | 2.00 | 100 | ○ | 0.65 | 190 | 50 | 3700 |
| Example 9 | 50 | Mo | 0.2 | 4.00 | 100 | ○ | 0.65 | 1800 | 210 | 2700 |
| Example 10 | 100 | Mo | 0.2 | 3.30 | 100 | ○ | 0.65 | 1300 | 170 | 3350 |
| Example 11 | 200 | Mo | 0.2 | 2.10 | 100 | ○ | 0.65 | 250 | 60 | 4200 |
| Example 12 | 150 | Ta | 0.2 | 1.10 | 100 | ○ | 0.65 | 600 | 70 | 3650 |
| Example 13 | 150 | Nb | 0.2 | 3.90 | 100 | ○ | 0.65 | 600 | 78 | 3500 |
| Example 14 | 150 | W | 0.2 | 2.20 | 100 | ○ | 0.65 | 650 | 80 | 3800 |
| Example 15 | 150 | Mo + Ta | 0.2 | 6.50 | 100 | ○ | 0.65 | 880 | 100 | 3880 |
| Comparative Example 1 | 150 | Mo | 0.2 | 20.80 | 0 | X | 0.65 | 98 | 35 | 3500 |
| Comparative Example 2 | 150 | None | None | — | — | — | 0.65 | 18 | 11 | 3500 |
| Comparative Example 3 | 50 | None | None | — | — | — | 0.65 | 880 | 95 | 2700 |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-234909, filed Dec. 1, 2015, and No. 2016-231043, filed Nov. 29, 2016, each disclosure of which tric layer between each pair, wherein said multilayer ceramic capacitor is characterized in that the dielectric layers are sintered bodies made of a dielectric material that contains a ceramic powder having Ba, Ti, and additive element X which is solid-solubilized and is at least one element selected from the group consisting of Mo, Ta, Nb, and W, wherein a standard deviation of a ratio of a peak intensity of the additive element X (XKα) measured by STEM-EDX (scanning electron microscopy/energy-dispersive X-ray analysis), and the sum of a peak intensity of the Ti and a peak intensity of the Ba (BaLα+TiKα) measured by STEM-EDX, is less than 10.5% of the average ratio as measured at a total of five points composed of three points that divide a maximum diameter of one grain of the ceramic powder into four equal parts, and two excluding a center point of three points that divide a diameter crossing at right angles with the maximum diameter, at its center point, into four equal parts.

2. A multilayer ceramic capacitor according to claim 1, characterized in that the dielectric layers are sintered bodies made of a dielectric material, wherein 80 percent by quantity or more of its ceramic powder is accounted for by gains whose standard deviation of the ratio of the peak intensity of the additive element X (XKα) measured by STEM-EDX, and the sum of the peak intensity of the Ti and peak intensity of the Ba (BaLα+TiKα) measured by STEM-EDX, is less than 10.5% of the average ratio as measured at a total of five points including the three points that divide the maximum diameter of the grain into four equal parts, and two excluding the center point of the three points that divide the diameter crossing at right angles with the maximum diameter at its center point, into four equal parts.

3. A multilayer ceramic capacitor according to claim 1, wherein the amount of additive element X in the dielectric layers is 0.05 to 0.3 mol per 100 mol of Ti.

4. A multilayer ceramic capacitor according to claim 2, wherein the amount of additive element X in the dielectric layers is 0.05 to 0.3 mol per 100 mol of Ti.

* * * * *